Patented Nov. 22, 1927.

1,650,274

UNITED STATES PATENT OFFICE.

ARTHUR M. HOWALD, OF PITTSBURGH, PENNSYLVANIA, ASSIGNOR TO THE GRASSELLI CHEMICAL COMPANY, OF CLEVELAND, OHIO, A CORPORATION OF OHIO.

WOOD IMPREGNATION.

No Drawing.  Application filed November 30, 1926. Serial No. 151,839.

This invention relates to a method of improving the penetrative properties of oils or oily wood-impregnating materials and to the improved or modified oily impregnating agents so produced. I have found that by dissolving or mixing certain organic chemicals with oily wood impregnating materials such as petroleum oils, coal tar oils, wood tar oils, mixtures thereof, and the like, a decided improvement in their penetrative properties results.

In an application Serial No. 151,838, filed November 30, 1926, I have described a method of improving the penetrative properties of oily wood impregnating materials by the treatment thereof with acid. That method as well as the method of the present invention is independent of the viscosity of the oily material, that is, the improvement in the penetrative properties of the oily material is not accomplished by reducing the viscosity thereof, any change in the viscosity of the oily materials as a result of the treatment being merely incidental.

Among the organic chemicals which when mixed with oily wood impregnating materials are capable of improving the penetrative properties thereof are certain compounds of the amine class such as aniline, triethanolamine, etc. Some creosote oils also, although they are not amines, have been found to improve the penetrative properties of oily wood impregnating materials in materially greater amount than can be accounted for by any incidental reduction in viscosity due to the mixing of the creosote oil with the oily impregnating material. The action of these substances in increasing the penetrative properties of oily wood impregnating materials is not fully understood, but it is presumably due to a modification of the properties of the oil whereby it more readily wets the wood fiber. The action of creosote oil presumably is due to some unidentified constituent or constituents since creosote oil is a mixture of materials some of which could not be expected to improve the wetting or penetrance properties of oils.

For the purpose of identification the action of the substances in improving the penetrative properties of the oily materials is referred to hereinafter as introfaction and the substances themselves as introfiers.

The quantity of introfier required is relatively small. For example, the addition of only 0.25% of triethanolamine to a non-penetrative Mexican petroleum oil has been found to increase its penetrance with respect to fir from 200% to 300%.

That the improvement in penetrance is not wholly the result of reduction in viscosity is proven by the fact that one may select two petroleum oils of identical viscosity one of which will penetrate much more readily and quickly than the other and one may even obtain oils of high viscosity which will penetrate more readily than similar oils of low viscosity. Moreover, differences in penetrative properties corresponding to differences in viscosity of similar oils have not been found to correspond to the differences in penetrative properties produced by relatively small additions of introfiers.

The viscosity of an oily wood impregnating agent which may be reduced by dilution with a thinner or by increasing its temperature or overcome by the employment of more intense penetrating conditions, particularly pressure, therefore is quite a different factor from the wood-fiber wetting properties of the oily materials which are improved by the addition of introfiers in accordance with the invention.

I claim:

1. Process of improving the penetrative properties of oily wood impregnating materials which consists in adding an introfier thereto.

2. Process of improving the penetrative properties of oily wood impregnating materials which consists in dissolving a compound of the amine class therein.

3. Process of improving the penetrative properties of oily wood impregnating materials which consists in dissolving triethanolamine therein.

4. Oily wood impregnating agents comprising an oily wood impregnating material and an introfier.

5. Oily wood impregnating agents comprising an oily wood impregnating material and a compound of the amine class.

6. Oily wood impregnating agents comprising an oily wood impregnating material and triethanolamine.

7. An oily wood impregnating agent comprising a petroleum oil and about 0.25% of triethanolamine.

In testimony whereof, I affix my signature.

ARTHUR M. HOWALD.